United States Patent [19]
Conway

[11] Patent Number: 6,038,811
[45] Date of Patent: Mar. 21, 2000

[54] LAWN EDGING SYSTEM AND METHOD FOR EDGING LAWN

[76] Inventor: Robert Matthew Conway, 112 Rock Creek, Pittsford, N.Y. 14534

[21] Appl. No.: 09/119,908

[22] Filed: Jul. 21, 1998

[51] Int. Cl.[7] .................................................. A01G 1/08
[52] U.S. Cl. ...................................................... 47/33
[58] Field of Search .................................. 47/33; 52/102; 404/6, 7, 34

[56] References Cited

U.S. PATENT DOCUMENTS

| Re. 7,996 | 12/1877 | Skinner et al. | 404/34 |
|---|---|---|---|
| 131,931 | 10/1872 | Bolliger | 404/34 |
| 606,151 | 6/1898 | Johnson . | |
| 992,529 | 5/1911 | Abraham . | |
| 1,879,281 | 9/1932 | Jarchow . | |
| 1,928,447 | 9/1933 | Cornell, Jr. . | |
| 2,662,342 | 12/1953 | Peterson . | |
| 3,041,781 | 7/1962 | Richter . | |
| 3,314,193 | 4/1967 | Chancellor . | |
| 3,378,949 | 4/1968 | Dorris . | |
| 3,520,082 | 7/1970 | Smith . | |
| 4,125,964 | 11/1978 | Waggoner . | |
| 4,321,769 | 3/1982 | Tisbo et al. . | |
| 4,372,079 | 2/1983 | Trageser . | |
| 4,809,459 | 3/1989 | Brylla et al. . | |
| 4,823,521 | 4/1989 | Kontz, Jr. . | |
| 4,858,379 | 8/1989 | West . | |
| 4,890,417 | 1/1990 | Futch et al. . | |
| 4,967,522 | 11/1990 | Keen . | |
| 4,969,289 | 11/1990 | Trifiletti | 47/33 |
| 4,973,192 | 11/1990 | Hair | 404/34 |
| 5,046,887 | 9/1991 | Fontana et al. | 404/34 |
| 5,048,241 | 9/1991 | Gavin, Jr. . | |
| 5,092,076 | 3/1992 | Terreta | 47/33 |
| 5,157,867 | 10/1992 | Fritch . | |
| 5,259,154 | 11/1993 | Lilley . | |
| 5,377,447 | 1/1995 | Fritch . | |
| 5,531,044 | 7/1996 | Wallenius . | |

FOREIGN PATENT DOCUMENTS

| 673 410 | 11/1963 | Canada | 52/102 |
|---|---|---|---|
| 2 118 243 | 3/1971 | Germany | 47/33 |

OTHER PUBLICATIONS

Gardner's Supply Company(America's Gardening Resource)Summer 1994, p. 21.

Unknown, Gardner's Supply Co.–Install a Decorative Landscape Border without Digging, Summer Catalog, pp. 20–21, 1994.

Primary Examiner—Michael J. Carone
Assistant Examiner—Jeffrey L. Gellner
Attorney, Agent, or Firm—Harter, Secrest & Emery LLP; Stephen B. Salai

[57] ABSTRACT

A lawn edging system and methods for edging a lawn are disclosed. The system includes a plurality of individual, integrally formed lawn edging units. Each unit includes a first portion and a substantially perpendicular second portion. The second portion includes a central section, having a length equal to the length of the first portion, and two end areas, which, when combined with the length of the central section, define a length greater than that of the first portion. The end areas are preferably rounded, but may be boxed, pointed, or scalloped. In use, an end area on one unit overlaps an end area of an adjacent unit while the first portions of the adjacent units abut. The second portion preferably includes an aperture for accepting a stake to anchor the unit into the ground. The aperture may be centrally located, or there may be a plurality of evenly spaced apertures. The design of the lawn edging device enables a plurality of lawn edging units to be nested compactly and packaged for sale or storage. In addition, the design of the lawn edging device enables the device to be either inserted into the ground to separate a grassy area from an adjacent ground area or placed against a vertical surface to separate the grassy area from the vertical surface. Thus, two alternate methods of use are disclosed.

20 Claims, 6 Drawing Sheets

LAWN EDGING SYSTEM AND METHOD FOR EDGING LAWN

FIELD OF THE INVENTION

The present invention relates to modular lawn edging units, and more particularly relates to a system of easily installable overlapping lawn edging devices designed to prevent the growth of lawn into an adjacent area.

BACKGROUND OF THE INVENTION

Gardeners and landscapers frequently utilize border or edging material, such as fences, logs, railroad ties, bricks, concrete blocks, and the like to provide a decorative edge for a lawn or garden, or to establish a terrace, or to surround a tree, or to contain mulch. Such border items are heavy, awkward to handle and place, and when in place they frequently prevent easy cutting or trimming of grass in the vicinity, as well as cause damage to equipment, such as mowers or grass trimmers, when such equipment comes into contact with the border.

Gardeners and landscapers also use edging devices to prevent lawn from growing into adjacent areas such as into mulched areas and gardens, through a fence, into the cracks of sidewalks, etc. Prior art edging devices usually consist of long uninterrupted strips of material that are sold in rolls and can be inserted between the lawn and adjacent area. Such devices are unwieldy and difficult to install. In addition, such devices can only be sold in rolls which take up a lot of shelf space and are not easy to package. If the devices are rolled too tightly, the product may be at risk of cracking.

Thus, there exists a need for a border which is easy to install and remove. There is further a need for a device which can be safely mowed over. There is further a need for a device which can be interchangeable between a fence edging and a lawn edging. There is further a need for a simple device which is molded in a single solid unit for strength and durability. There is further a need for a device which can be sold in compact units and is easy to package.

SUMMARY OF THE INVENTION

With the above needs in mind, it is an object of the present invention to provide a simple lawn edging unit having a substantially L-shaped cross-section wherein one portion of the unit is longer on both ends than the other portion of the unit.

It is a further object of the present invention to provide a unit which can be used for edging grassy areas from adjacent ground level areas as well as for edging grassy areas from adjacent vertical surfaces.

It is a further object of the present invention to provide a plurality of such units in a system which can be nested for sale or storage.

It is a further object of the present invention to provide integrally formed lawn edging units for strength and durability.

It is a further object of the present invention to provide stake receiving apertures in the units and stakes for securing the units to the ground.

In view of the above objects, a lawn edging device is disclosed which comprises a first portion substantially perpendicular to a second portion. Preferably, the first portion is a rectangle, and the second portion has a length greater than the first portion length. The second portion is provided with at least one aperture, which may be a single centrally located aperture or a plurality of evenly spaced apertures, for receiving a stake or stakes to anchor the device into the ground. The first and second end areas of the second portion may be rounded, scalloped, pointed, or boxed (i.e., a truncated version of pointed). Preferably, the device is integrally formed such that the first portion and second portion are integral.

A modular lawn edging system is thus disclosed which comprises a plurality of the individual, unconnected lawn edging devices described above, wherein the first end area of one device may overlap the second end area of an adjacent device and the devices are nested for packaging or storing.

The same lawn edging system may be used in two methods. The first portion of a lawn edging device may either be inserted into the ground or pressed up against a vertical surface. In either method, the second portion is staked into the ground, although from different sides. As additional units are installed, the first portion of one unit abuts a first portion of an adjacent unit and a first end area of a second portion of one unit overlaps a second end area of a second portion of the adjacent unit. These steps are repeated until the grassy area is separated from the adjacent ground area or vertical surface by a continuous border of the edging units.

Other objects, features and advantages of the present invention will become apparent from the following detailed description of the preferred embodiment when taken in conjunction with the accompanying drawings.

DETAILED DESCRIPTION OF THE PREFERRED EMBODIMENTS

Figure 1:
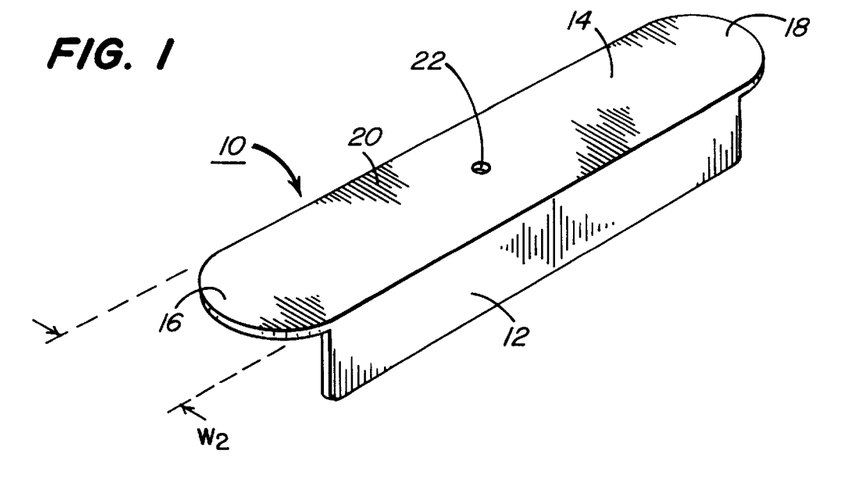
FIG. 1 shows a front perspective view of a lawn edging unit in one embodiment of the present invention.
Figure 2:
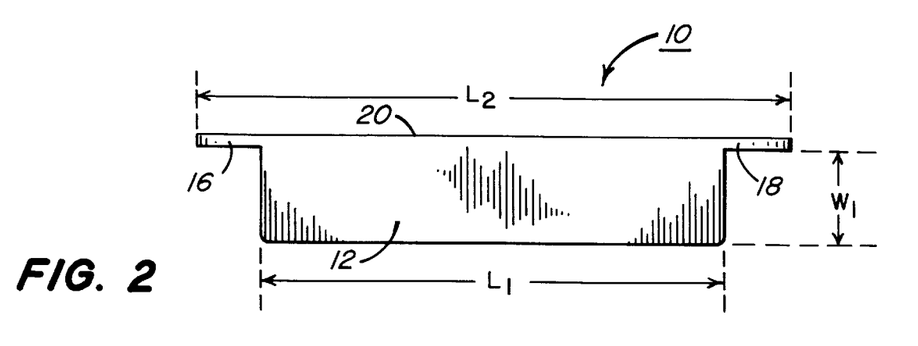
FIG. 2 shows a front plan view of the lawn edging unit of FIG. 1.
Figure 3:
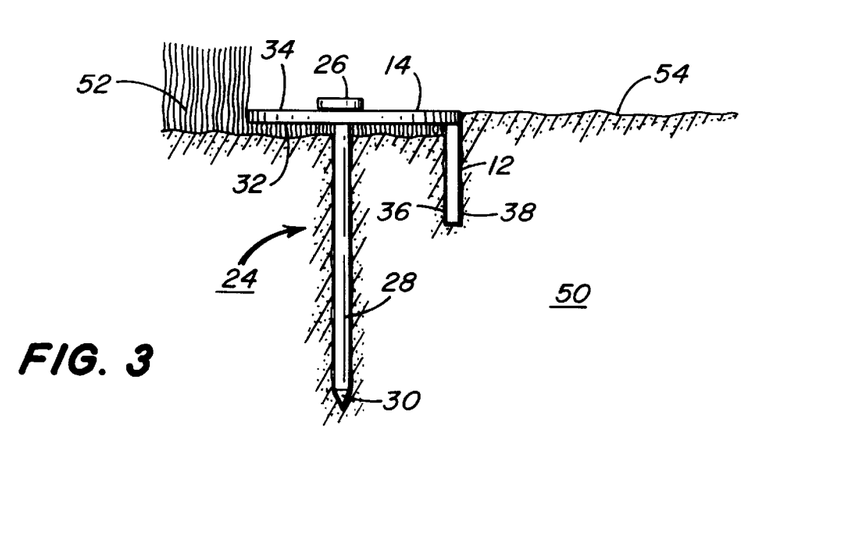
FIG. 3 shows a side view of the lawn edging unit of FIG. 1 in one method for using the present invention.

A first preferred embodiment of the present invention is shown in FIG. 1. FIG. 1 shows a single lawn edging unit 10. The unit 10 includes a first portion 12 and a second portion 14. The second portion 14 is a mowing strip, while the first portion 12 may be either a ground insertion section or a wall abutting section. Both portions are preferably substantially planar with substantially even and equal thicknesses. The first portion 12 is preferably rectangular, as shown, with one of the long sides of the rectangle attached to the second portion 14. The first portion 12 has a length L1 and the second portion 14 has a length L2, which is longer than the length L1, as shown in FIG. 2. The first 12 and second 14 portions are substantially perpendicularly connected, as shown in FIG. 3. The second portion 14 preferably includes at least one stake receiving aperture 22. The second portion 14 includes a central section 20 which has a length of at least L1. The second portion 14 further includes two end areas 16 and 18 which extend past the length L1 of the first portion 12. Thus, the end areas 16 and 18 are separated by the central section 20, which indirectly connects the end areas 16, 18 to the first portion 12. The combined end-to-end lengths of the end areas 16 and 18 and the central section 20 equals the length L2 of the second portion 14. The width W2 of the second portion 14 is preferably about 3 inches which is a dimension found to be wide enough to prevent most grass from growing from a grassy area to an adjacent area. The width W1 of the first portion 12 is preferably wide enough to prevent the root structure of a grassy area from creeping around the first portion 12.

Figure 4A:
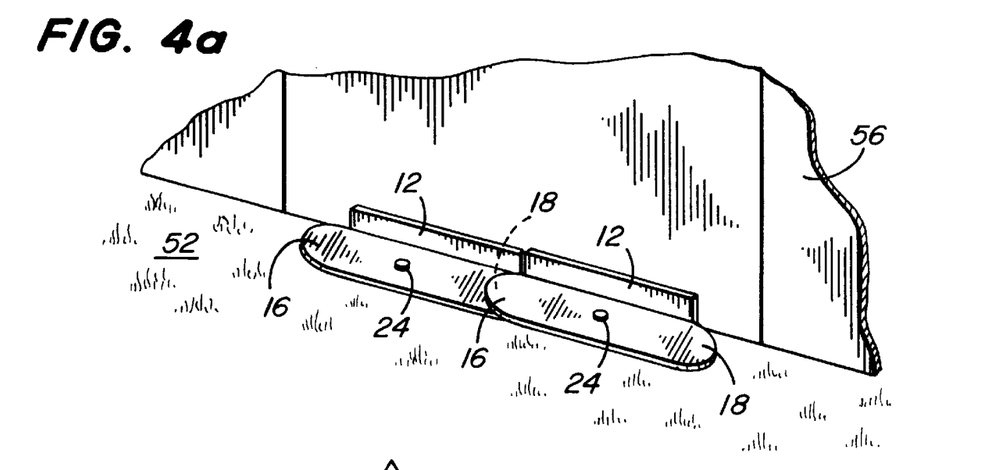
FIG. 4A shows a top perspective view of the lawn edging unit of FIG. 1 in another method for using the present invention.
Figures 4B, 7:
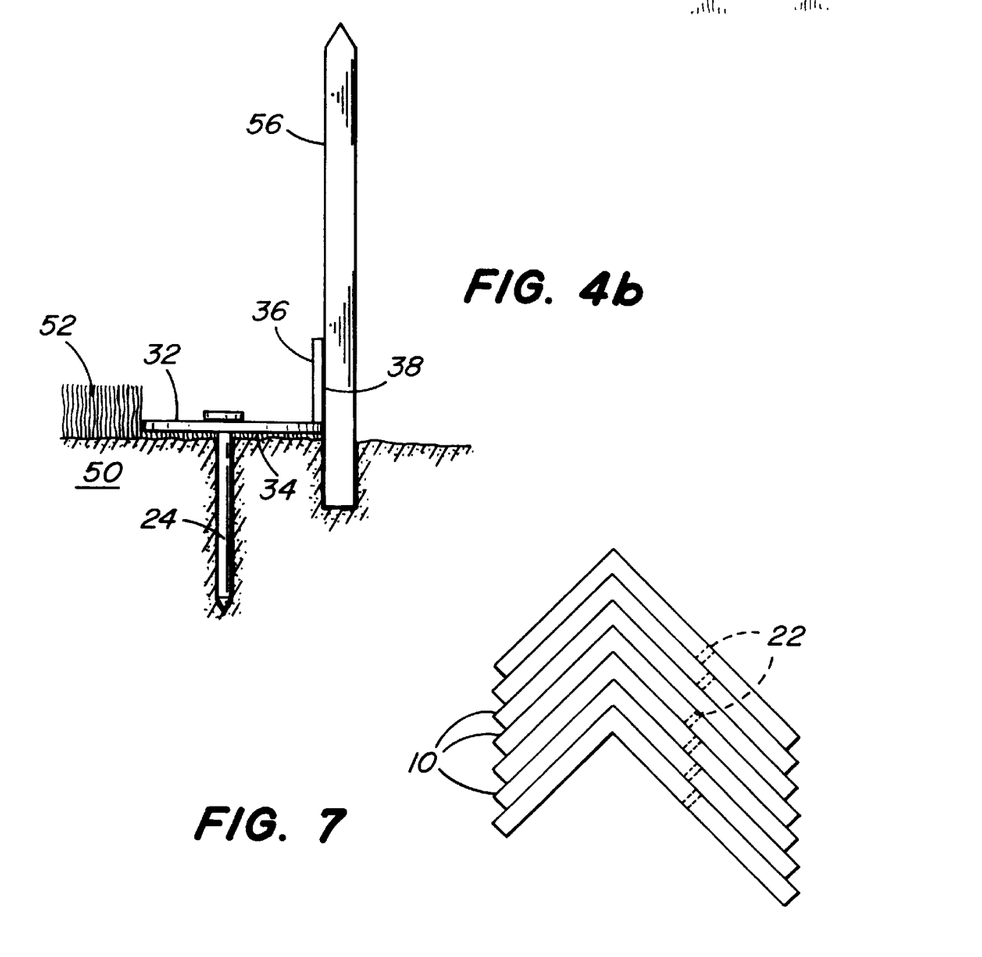
FIG. 4B shows a side view of the method shown in FIG. 4A.
FIG. 7 shows a side view of a plurality of stacked lawn edging units.

Two different manners for using the lawn edging unit 10 are shown in FIGS. 3 and 4. As shown in FIG. 3, the first portion 12 of the unit 10 is pressed into the ground 50 to separate a grassy area 52 from an area 54 in which grass is not desired. Such an area 54 may include, but is not limited to, a garden, a mulched area, a sidewalk, and a driveway. An inner surface 36 of the first portion 12 faces the grassy area 52 while an outer surface 38 of the first portion 12 faces the adjacent area 54. The first portion 12 is pressed into the ground 50 until an inner side 32 of the second portion 14 lies adjacent the ground surface. Then, a stake 24 is passed through the stake receiving aperture 22 to anchor the unit to the ground 50. The stake 24 may be a simple cylindrical rod, or, as shown in FIG. 3, may include a head 26 and a shaft 28 with a tip 30. It should be understood, however, that any design of a stake is within the scope of this invention. Depending on the hardness of the ground 50 and design of the stake 24, the stake 24 may be either simply pushed into or may be hammered into the ground. The grass in the grassy area 52 may be mowed right over the second portion 14 which serves as a mowing strip since the outer surface 34 of the second portion 14 lies substantially level with the surface of the ground 50.

Turning now to FIGS. 4A and 4B, an additional manner of using the lawn edging unit 10 is shown. The lawn edging unit 10 may be used to prevent grass from a grassy area 52 growing adjacent a vertical surface 56. The vertical surface 56 may include, but is not limited to, a fence, a building, and a stone wall. In use, the outer surface 34 of the second portion 14 is placed against the ground surface and the outer surface 38 of the first portion 12 is placed against the vertical surface 56. A stake 24 passes through the second portion 14 and secures the unit 10 in place. Thus, the inner surface 32 of the second portion 14 serves as a mowing strip and the inner surface 36 of the first portion 12 protects the vertical surface 56 from the lawnmower.

Figure 5:
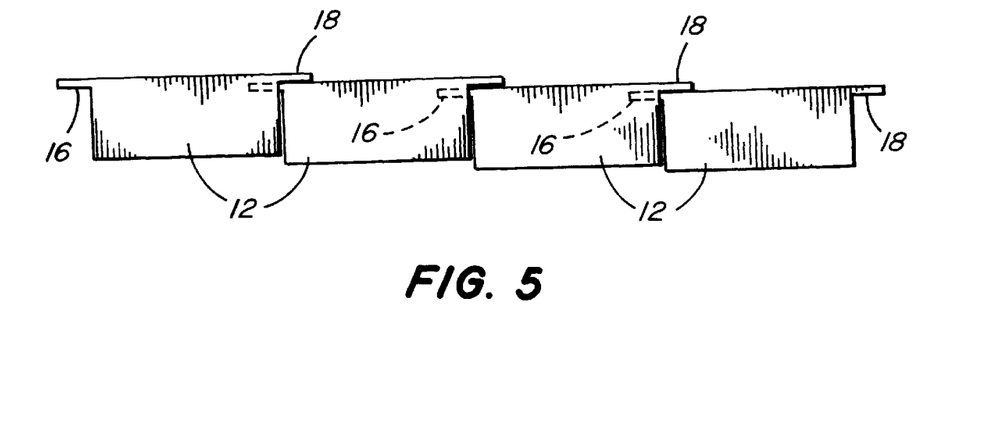
FIG. 5 shows a front view of a plurality of overlapping lawn edging units of the present invention.
Figure 6:
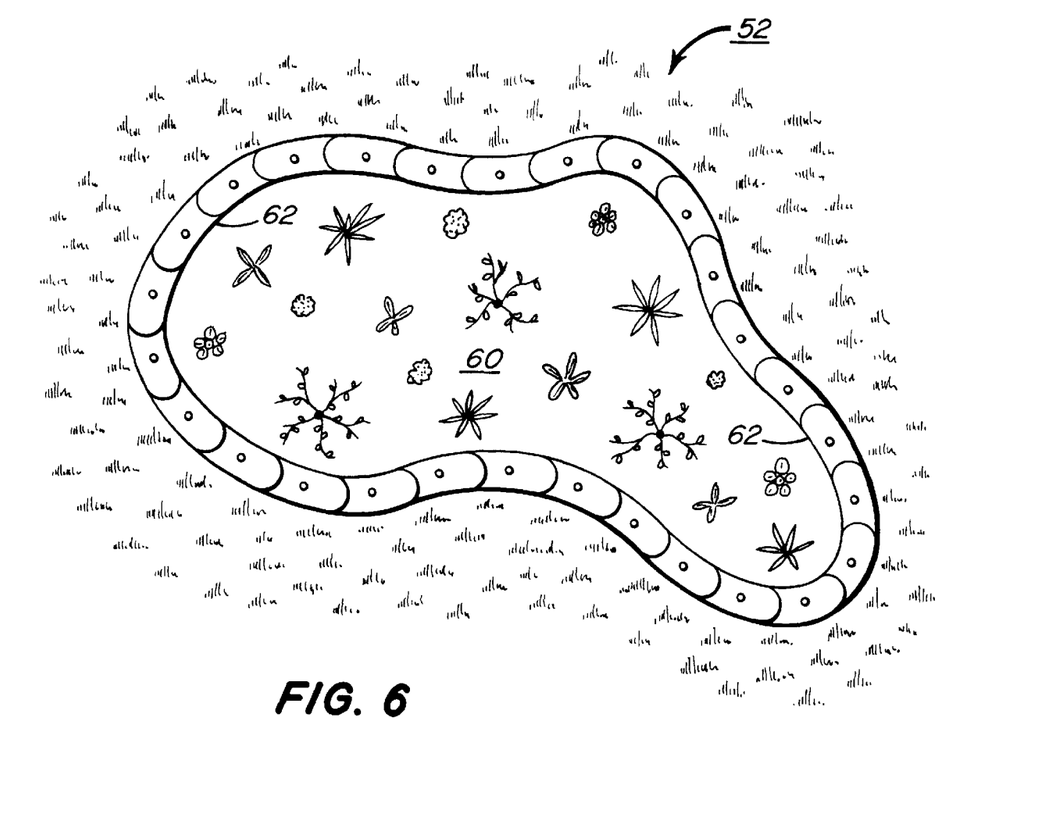
FIG. 6 shows a top view of a plurality of overlapping lawn edging units in one method for using the present invention.

FIG. 4A shows how two adjacent units 10 may overlap. In particular, one end area, e.g. end area 16 may overlap an end area 18 (hidden from view) of an adjacent unit while the first portions 12 of the adjacent units 10 abut. FIG. 5 shows how adjacent units may overlap when used in the manner shown in FIG. 3. Again, the first portions 12 abut so as to prevent grass from creeping between the units 10 and end areas 16 and 18 overlap each other for the same purpose. An additional advantage to the overlapping end areas is that any curved edging can be accommodated. For example, as shown in FIG. 6, a mulch bed 60 with flowers and bushes has a curved periphery 62. The individual units 10 can overlap each other to surround the periphery 62 and form a continuous border between the grassy area and the mulch bed. Either end area 16 or 18 can overlap an end area 18 or 16 on an adjacent unit 10.

Another advantage of the units 10 of the present invention is that they can easily be stacked as shown in FIG. 7, and packaged together for storage or for sale. The units 10 are preferably sold in foot long segments (where first portion 12 has a length L1 of 12 inches), although other lengths are within the scope of this invention.

Figure 8:
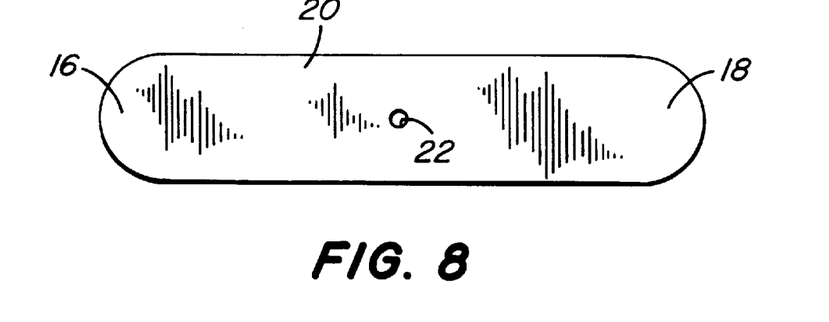
FIG. 8 shows a top plan view of a lawn edging unit having a centrally located stake receiving aperture in one embodiment of the present invention.
Figure 9:
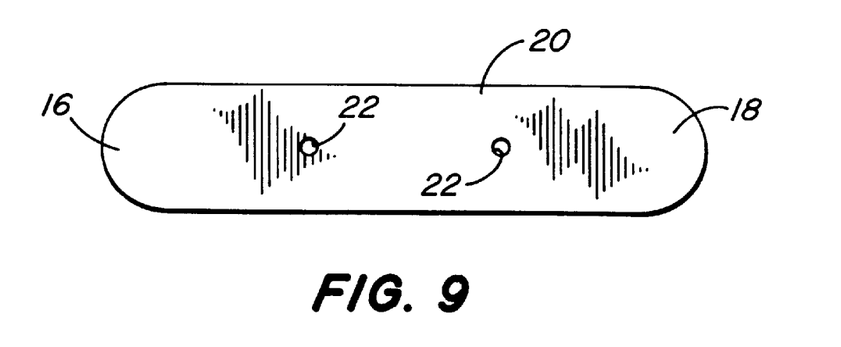
FIG. 9 shows a top plan view of a lawn edging unit having a pair of evenly spaced stake receiving apertures in another embodiment of the present invention.
Figure 10:
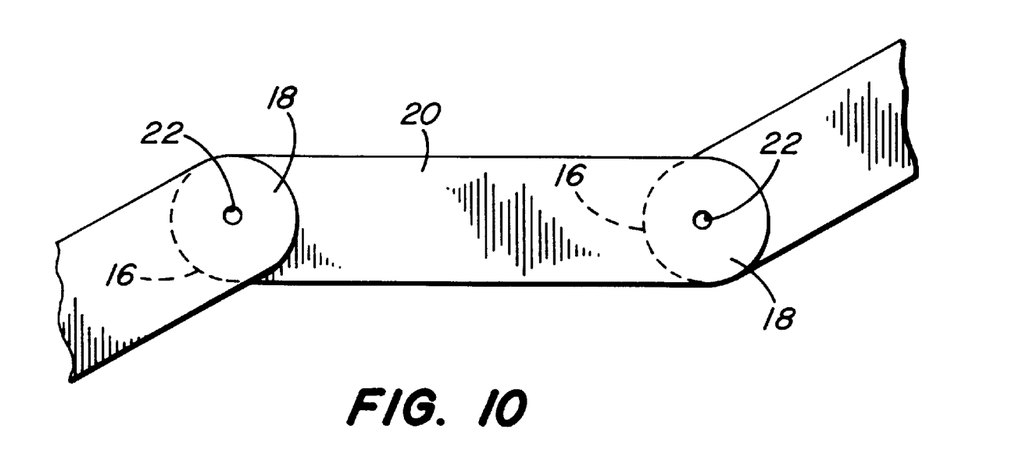
FIG. 10 shows a top plan view of a plurality of overlapping lawn edging units, each with a pair of evenly spaced stake receiving apertures in yet another embodiment of the present invention.

FIGS. 8–10 show alternate embodiments of the locations of the stake receiving apertures 22. FIG. 8 shows a centrally located aperture 22, which is located in central section 20. FIG. 9 shows two evenly spaced apertures 22, but still within the central section 20. FIG. 10 shows two spaced apertures 22, one within end area 16 and one within end area 18, such that the holes of overlapping end areas may accept a single stake. Other stake receiving aperture arrangements are also possible.

Figure 11:
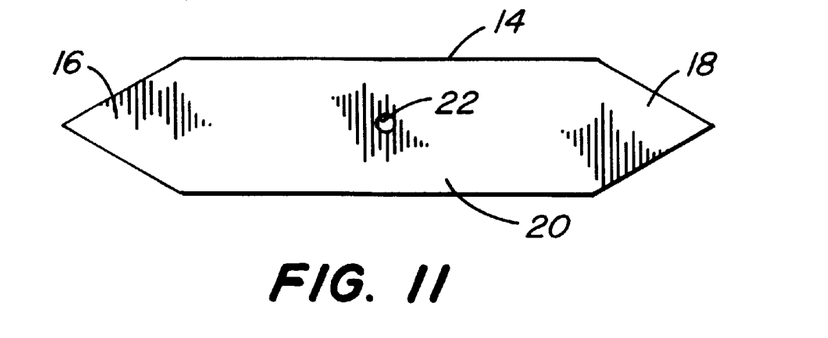
FIGS. 11–13 show top plan views of various embodiments of the end area peripheries of the lawn edging unit of the present invention.
Figure 12:
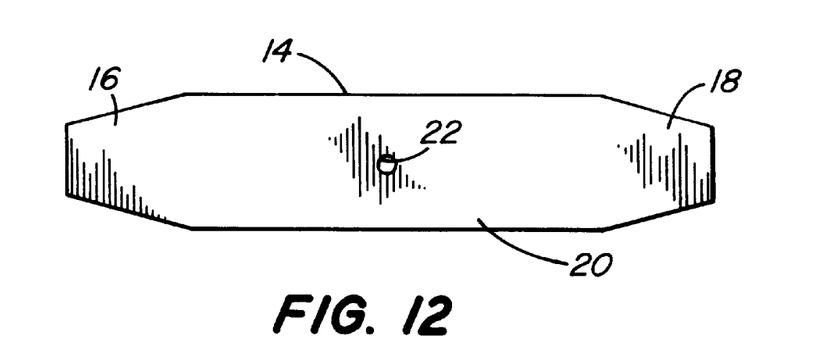
Figure 13:
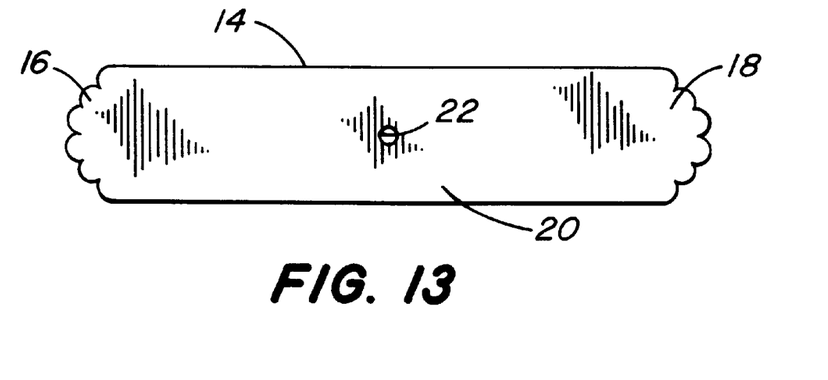

FIGS. 11–13 show alternate embodiments of the periphery for the second portion 14. The preferred periphery is the semicircular shape of the end areas 16 and 18 as shown in FIG. 8. However, other various peripheries of the end areas may be used for decorative purposes. For example, FIG. 9 shows a triangular shape of the end areas 16 and 18 while FIG. 10 shows a boxed shape, and FIG. 11 shows a scalloped shape. The central section 20 preferably remains unchanged.

Figure 14:
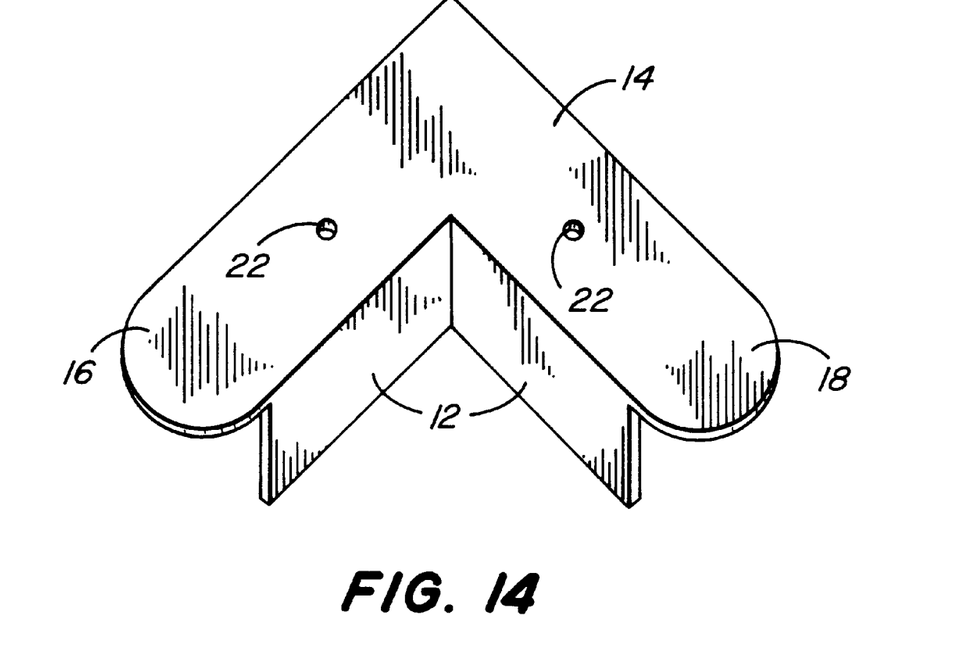
FIG. 14 shows a corner lawn edging unit according to another aspect of the lawn edging device of the present invention.
Figure 15:
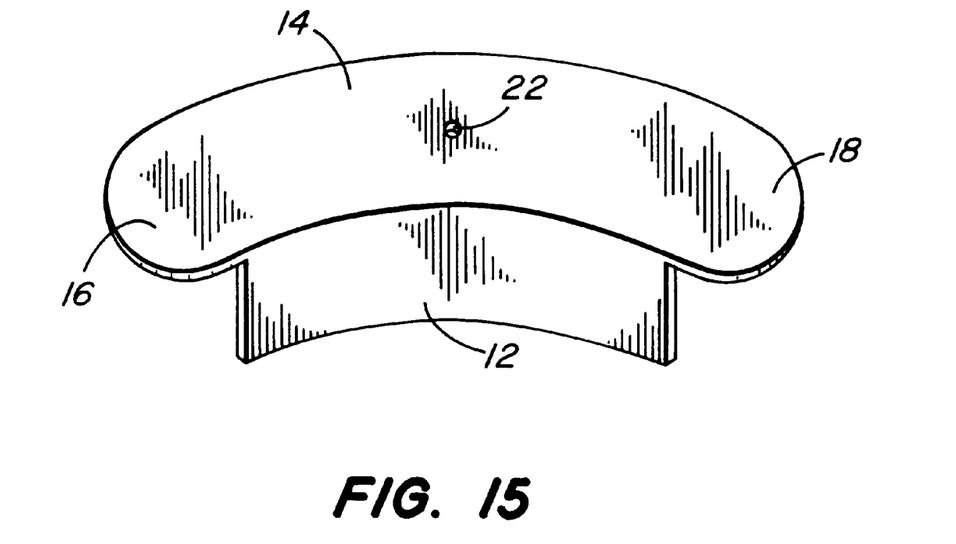
FIG. 15 shows a curved lawn edging unit according to yet another aspect of the lawn edging device of the present invention.

FIGS. 14 and 15 show alternate embodiments of lawn edging units that may be used for special purposes, e.g. for corners or curved sections. FIG. 14 is a corner section with a pair of perpendicular first portions 12 and a second portion 14 having the L-shape shown. The end areas 16 and 18 extend beyond the edge of the first portions 12. FIG. 15 shows a curved section with a curved wall for first portion 12 and a curved plate for second portion 14. Again, the end areas 16 and 18 extend beyond the periphery of the first portion 12. The curved section of FIG. 15 may be used when smaller radii of curvatures are desired for an edging which could not be accommodated with individual straight units.

In all of the above described embodiments, each unit preferably consists of an integrally formed single piece of material. Preferably, the modular pieces are made of recycled plastics (e.g. from curbside recycling programs) or from recycled rubber (e.g. from discarded automobile tires). The spike may also be made from recycled plastic as well. Although these materials are preferred for their extrusion capabilities, any other suitable material is within the scope of this invention. Also, because a system of units of the present invention is essentially "modular", i.e. can be used to edge various peripheries, the individual units need not be very flexible and are preferably substantially rigid for durability. Although black or dark gray are currently among the more popular colors of choice for lawn edging, the manufacturing process of the units could add any color or texture to the units.

As previously discussed with respect to FIG. 7, it is envisioned that the lawn edging units 10 are sold in packages containing a plurality of such units, together with the appropriate number of stakes 24. In use, the first end area of a second portion of one device may overlap a second end area of a second portion of another adjacent device to define a continuous visible border strip which is substantially even to the ground and thus may be mowed over. Whether the first portion is pushed into the ground or laid up against a vertical surface, the adjacent units may be arranged such that the first portion of one unit abuts the first portion of an adjacent unit.

Advantages of this design include 1) permanence: erosion is prevented by shielding the top and side of a garden edge. The clearly defined edge will remain as intended: 2) low maintenance: the purpose of the second portion is to provide a flat surface that allows the wheel of a lawn mower to travel along it, thereby eliminating most trimming that would need to be done with other designs of edging. The surface of the unit is at ground level, so there are no parts of the design that would be damaged or pulled out by the lawn mower; 3) ease of installation: if the border is already there, a shovel is not required. Simply hammer the stakes into the ground to install the edging; 4) ease of removal: since the units are only individually attached to the ground by a stake or stakes, removing them is as simple as pulling out the stakes and pulling on the second portion; 5) alternate method of use: if grass is against a building or a fence, the units can also be turned upside down, such that the first portions are against the vertical surface. With either method of use, the same advantages are provided.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

I claim:

1. A modular lawn edging system comprising
   a plurality of unconnected lawn edging devices, each device having
   a first portion having a first portion length; and
   a second portion attached substantially perpendicularly to the first portion, wherein the second portion has a unitary central section having a length equal to the first portion length, the central section attached entirely along its length to the first portion, the second portion further having a first end area and a second end area separated by the central section;
   wherein the first portion is adapted for both insertion into the ground and for lying flush against an above-ground vertical surface, and the second portion is adapted to lie flush against the ground; and,
   wherein the first end area of one device may overlap the second end area of an adjacent device.

2. The lawn edging system of claim 1 wherein each device is a one-piece device which is integrally formed such that the first portion and second portion are integral.

3. The lawn edging system of claim 2 wherein each device is substantially rigid and inflexible.

4. The lawn edging system of claim 1 wherein the lawn edging devices are nested for packaging or storage.

5. The lawn edging system of claim 1 wherein the first portion of each device is a rectangle, the first portion length defining a long side of the rectangle.

6. The lawn edging system of claim 1 wherein the second portion of each device is provided with at least one aperture.

7. The lawn edging system of claim 6 wherein the at least one aperture is a single centrally located aperture.

8. The lawn edging system of claim 6 wherein the at least one aperture is a plurality of evenly spaced apertures.

9. The lawn edging system of claim 6 further comprising a plurality of stakes, at least one stake for each device adapted to pass through the at least one aperture in each device.

10. The lawn edging system of claim 1 wherein the second portion of each device has a greater surface area than the first portion.

11. The lawn edging system of claim 1 wherein the first and second end areas of each device are rounded.

12. The lawn edging system of claim 1 wherein the first and second end areas of each device are scalloped.

13. The lawn edging system of claim 1 wherein the first and second end areas of each device are pointed.

14. The lawn edging system of claim 1 wherein the first portion and the second portion of each device are planar and have substantially even and equal thicknesses.

15. A method for edging lawn utilizing a plurality of lawn edging devices, each device having a first portion having a first portion length, and a second portion attached substantially perpendicularly to the first portion, wherein the second portion has a unitary central section, the central section having a length equal to the first portion length, the central section attached entirely along its length to the first portion, the second portion further having a first end area and a second end area separated by the central section, the method comprising the steps of
   inserting a first portion of a first lawn edging device into a first section of ground;
   staking a second portion of the first lawn edging device into the ground;
   inserting a first portion of a second lawn edging device into a second section of ground to abut the first portion of the first lawn edging device;
   overlapping a first end area of a second portion of the second lawn edging device with a second end area of the second portion of the first lawn edging device;
   staking the second portion of the second lawn edging device into the ground.

16. The method of claim 15 further comprising the steps of inserting, overlapping, and staking additional lawn edging devices until a grassy area is separated from an adjacent non-grassy area.

17. The method of claim 15 further comprising the steps of:
   placing a first portion of a third lawn edging device against an above-ground vertical surface;
   staking a second portion of the third lawn edging device into the ground;
   placing a first portion of a fourth lawn edging device against the above-ground vertical surface to abut the first portion of the third lawn edging device;
   overlapping a first end area of a second portion of the fourth lawn edging device with a second end area of the second portion of the third lawn edging device;
   staking the second portion of the fourth lawn edging device into the ground.

18. The method of claim 17 further comprising the steps of placing, overlapping, and staking additional lawn edging devices until a grassy area is separated from the vertical surface by a continuous border of the lawn edging devices.

19. A lawn edging device comprising:

a first portion having a first portion length; and a second portion attached substantially perpendicularly to the first portion, wherein the second portion has a unitary central section having a length equal to the first portion length, the central section attached entirely along its length to the first portion, the second portion further having a first end area and a second end area separated by the central section;

wherein the first portion is adapted for both insertion into the ground and for lying flush against an above-ground vertical surface, and the second portion is adapted to lie flush against the ground; and, wherein the first end area of one device may overlap the second end area of an adjacent device.

20. The lawn edging device of claim 19 wherein the second portion has a central section which is connected entirely along its length to the first portion, the second portion further having a first end area and a second end area separated by and connected only to the central section, the first end area and the second end area thereby being only indirectly connected to the first portion, wherein the first and second end areas and the central section have a combined length which defines the second portion length.

* * * * *